(12) United States Patent
Huber

(10) Patent No.: US 11,963,514 B2
(45) Date of Patent: Apr. 23, 2024

(54) **SYSTEMS, APPARATUSES, AND METHODS FOR HIGH-THROUGHPUT SCREENING OF *DROSOPHILA* ADDICTION PHENOTYPES**

(71) Applicant: Bowling Green State University, Bowling Green, OH (US)

(72) Inventor: Robert Huber, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 0 days.

(21) Appl. No.: 18/284,988

(22) PCT Filed: Mar. 30, 2022

(86) PCT No.: PCT/US2022/022438
§ 371 (c)(1),
(2) Date: Sep. 29, 2023

(87) PCT Pub. No.: WO2022/212435
PCT Pub. Date: Oct. 6, 2022

(65) Prior Publication Data
US 2024/0081288 A1 Mar. 14, 2024

Related U.S. Application Data

(60) Provisional application No. 63/169,274, filed on Apr. 1, 2021.

(51) Int. Cl.
*A01K 15/02* (2006.01)
*A01K 1/03* (2006.01)

(52) U.S. Cl.
CPC .............. *A01K 15/02* (2013.01); *A01K 1/031* (2013.01)

(58) Field of Classification Search
CPC ...... A01K 15/02; A01K 1/031; A01K 15/021; A01K 1/03; A01K 1/02; A01K 29/005
See application file for complete search history.

(56) References Cited

U.S. PATENT DOCUMENTS

| | | | | |
|---|---|---|---|---|
| 4,337,726 A | * | 7/1982 | Czekajewski | A01K 29/005 600/595 |
| 4,574,734 A | * | 3/1986 | Mandalaywala | A01K 1/031 119/421 |
| 4,968,974 A | * | 11/1990 | Sakano | A01K 1/031 250/221 |
| 5,003,922 A | * | 4/1991 | Niki | A01K 1/031 119/72.5 |
| 7,086,350 B2 | * | 8/2006 | Tecott | A01K 1/031 119/421 |
| 7,389,744 B2 | * | 6/2008 | Zhang | A61B 5/1105 119/421 |
| 10,687,509 B1 | * | 6/2020 | Harada | A01K 1/031 |
| 10,825,549 B2 | * | 11/2020 | Betts-Lacroix | A01K 1/031 |
| 10,918,078 B1 | * | 2/2021 | Betts-Lacroix | A01K 29/005 |

(Continued)

OTHER PUBLICATIONS

PCT International Search Report and Written Opinion, Application No. PCT/US22/22438, dated Jul. 26, 2022.

*Primary Examiner* — Trinh T Nguyen
(74) *Attorney, Agent, or Firm* — MacMillan, Sobanski & Todd, LLC

(57) ABSTRACT

Systems, apparatuses, and methods for analyzing conditioned cue preference in an animal such as a fruit fly are described.

32 Claims, 6 Drawing Sheets
(4 of 6 Drawing Sheet(s) Filed in Color)

(56) References Cited

U.S. PATENT DOCUMENTS

| | | |
|---|---|---|
| 10,959,398 B1* | 3/2021 | Betts-Lacroix ...... G06V 10/143 |
| 2003/0199944 A1 | 10/2003 | Chapin et al. |
| 2005/0105051 A1 | 5/2005 | Jones et al. |
| 2005/0133701 A1 | 6/2005 | Anderson, II |
| 2007/0037277 A1 | 2/2007 | Shuler et al. |
| 2008/0306980 A1 | 12/2008 | Brunner et al. |
| 2016/0150758 A1* | 6/2016 | Salem .................. A01K 29/005 119/421 |

* cited by examiner

US 11,963,514 B2

SYSTEMS, APPARATUSES, AND METHODS FOR HIGH-THROUGHPUT SCREENING OF *DROSOPHILA* ADDICTION PHENOTYPES

RELATED APPLICATIONS

This is the national phase entry of international application PCT/US2022/022438, filed under the authority of the Patent Cooperation Treaty on Mar. 30, 2022, published; which claims priority to U.S. Provisional Application No. 63/169,274, filed under 35 U.S.C. § 111(b) on Apr. 1, 2021. The entire disclosure of each of the aforementioned applications is expressly incorporated herein by reference for all purposes.

STATEMENT REGARDING FEDERALLY SPONSORED RESEARCH

This invention was made with no government support. The government has no rights in this invention.

BACKGROUND

Natural reward is an essential element of any organism's ability to adapt to environmental variation. Its underlying circuits and mechanisms guide the learning process as they help associate an event, or cue, with the perception of an outcome's value. More generally, natural reward serves as the fundamental generator of all motivated behavior.

As one example, with modularly organized nervous systems and confirmed vulnerabilities to human drugs of abuse, fruit flies are a useful model for the study of the addiction cycle, including psychostimulant effects, sensitization, withdrawal, reinstatement, and drug reward in conditioned cue preference paradigms. There is a need in the art for new and improved systems and methods for analyzing conditioned cue preference in fruit flies and other animals.

SUMMARY

Provided is an apparatus comprising a platform disposed on a floor, wherein the platform defines a plurality of slots therein; a vessel slot in the platform configured to house a vessel defining a vessel area, and a cut in the vessel slot dividing the vessel slot into a first area and a second area; a first light source slot in the floor configured to house a first light source of a first color; and a second light source slot in the floor configured to house a second light source of a second color; wherein the first light source slot and the second light source slot are positioned in the floor such that the first light source may illuminate the first area with the first color, and the second light source may illuminate the second area with the second color.

In certain embodiments, the cut is a straight dividing line between the first area and the second area. In certain embodiments, the cut is configured to restrict light projected into the vessel slot into the first area or the second area.

In certain embodiments, the floor has a larger area than the platform.

In certain embodiments, the first area and the second area are half circles. In particular embodiments, the half circles are equally sized.

In certain embodiments, the platform is within an at least partly enclosed area having side walls and a ceiling.

In certain embodiments, the apparatus further comprises a vessel positioned within the vessel slot; a first light source in the first light source slot; and a second light source in the second light source slot. In particular embodiments, the first light source is configured to illuminate the first area, and not the second area, with the first color; and the second light source is configured to illuminate the second area, and not the first area, with the second color. In particular embodiments, the vessel is a petri dish. In particular embodiments, the apparatus comprises a plurality of vessels. In particular embodiments, the apparatus comprises a first row of vessels and a second row of vessels, and the first light source is configured to illuminate the first area of each of the vessels in the first row and the second row with the first color, and the second light source is configured to illuminate the second area of each of the vessels in the first row and the second row with the second color. In particular embodiments, a bottom of each of the vessels is covered with a layer of gel food medium, wherein one half contains a test substance and one half does not contain the test substance.

In particular embodiments, each side of the vessel holds gel food medium, where a first side contains a test substance and a second side does not contain a test substance. In particular embodiments, each side of the vessel holds gel food medium, wherein a first side holds a first test substance and a second side holds a second test substance.

In certain embodiments, the apparatus comprises a plurality of the vessel slots. In particular embodiments, the apparatus comprises a plurality of vessels in the vessel slots.

In certain embodiments, the apparatus comprises a plurality of first light sources and a plurality of second light sources, wherein each of the first light sources is configured to illuminate the first area, and not the second area, of at least one vessel with the first color, and each of the second light sources is configured to illuminate the second area, and not the first area, of at least one vessel with the second color. In particular embodiments, each of the first light sources is configured to illuminate the first area of a plurality of vessels, and each of the second light sources is configured to illuminate the second area of a plurality of vessels.

In certain embodiments, the first half and the second half are separated by a straight line where the first color and the second color meet.

In certain embodiments, the vessel is configured to hold a food and to house an animal. In certain embodiments, the vessel is a petri dish.

In certain embodiments, the apparatus further comprises a video camera configured to observe within the area.

Further provided is an apparatus comprising a platform supported on a floor, the platform defining a well; a plurality of cells in the well, wherein each cell is defined by the floor and walls, and each cell is separated from one another; a first light source slot in the floor being configured to house a first light source of a first color; and a second light source slot in the floor being configured to house a second light source of a second color; wherein the first light source slot and the second light source slot are positioned in the floor with respect to the plurality of cells such that a first light source of a first color disposed in the first light source slot may illuminate a first area of the floor inside at least one of the cells with the first color, and a second light source of a second color disposed in the second light source slot may illuminate a second area of the floor inside the at least one cell with the second color.

In certain embodiments, the plurality of cells comprises a plurality of rows of the cells. In particular embodiments, each of the rows is separated from an adjacent row by a divider wall. In particular embodiments, the second light source slot is positioned so as to allow a second light source disposed in the second light source slot to illuminate the first area of the floor inside at least one cell and to illuminate the first area of the floor inside at least one cell in a different row of the plurality of rows.

In certain embodiments, the apparatus comprises a plurality of first light source slots and a plurality of second light source slots.

Further provided is a system comprising a first apparatus configured to establish an association to an animal between a test substance and a color; and a second apparatus configured to test the animal's preference for, or aversion to, a colored cue that was paired to the test substance by presenting the animal a choice between two spaces, wherein one of the spaces is illuminated with the color and the other one of the spaces is illuminated with a different color. In certain embodiments, the system further comprises a video camera configured to observe animals in the first apparatus or the second apparatus. In certain embodiments, the system further comprises tracking software configured to track movement of the animals in either of the first apparatus or the second apparatus.

Further provided is a method for analyzing conditioned cue preference, the method comprising exposing an animal to a test substance in a vessel containing food in two areas, wherein a first area includes food with the test substance and is illuminated with a first color, and a second area includes food without the test substance and is illuminated with a second color; and removing the animal from the exposure to the test substance, and providing the animal with a choice between the first color and the second color to analyze the animal's conditioned cue preference. In certain embodiments, the illumination of the first area and the second area is by light sources mounted within slots of an apparatus housing the vessel. In particular embodiments, the slots are in the apparatus on a first side of the vessel and an opposing second side of the vessel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
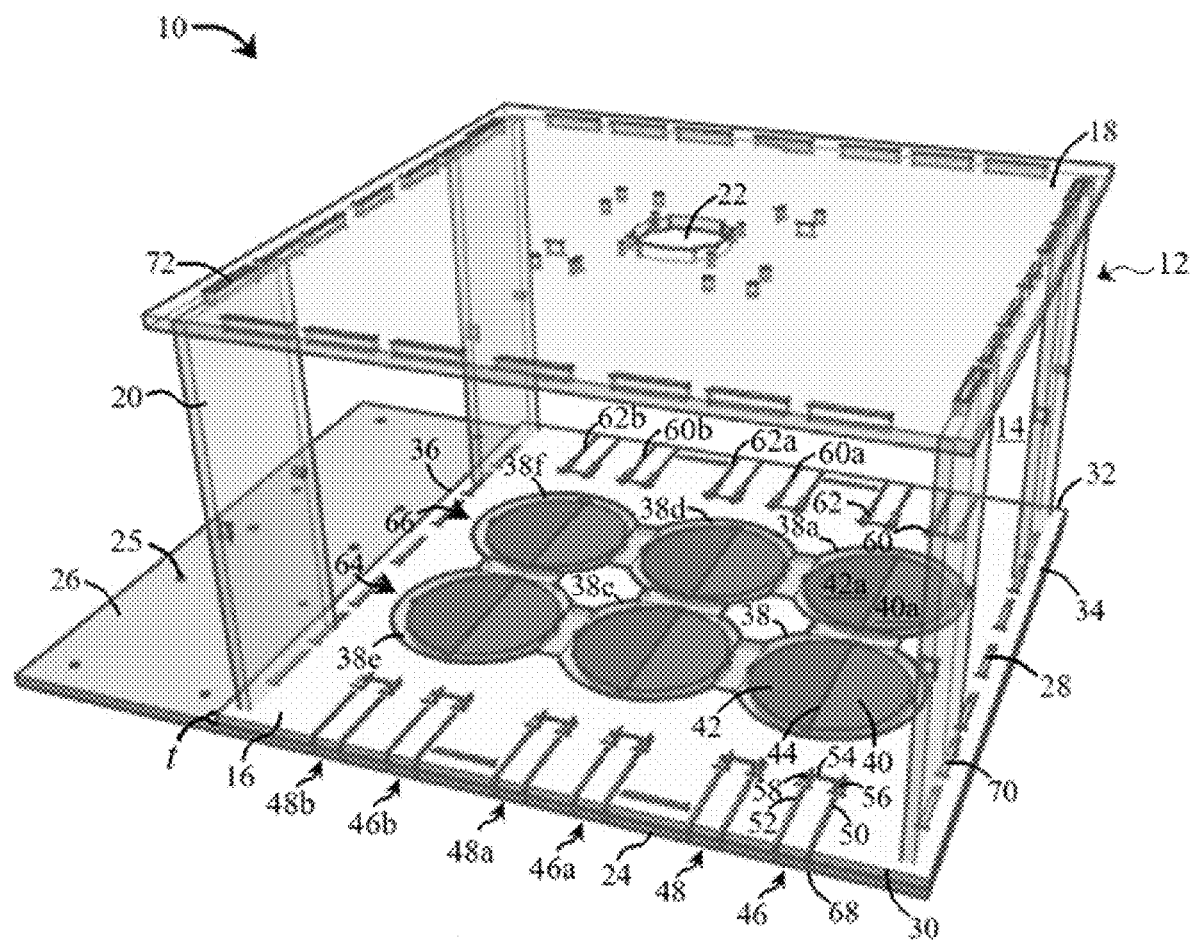
FIGS. 1A-1C: Illustration of a non-limiting example embodiment of a training apparatus (FIG. 1A), and photographs of a non-limiting example floor (FIG. 1B) and platform (FIG. 1C) for a training apparatus. The illustration in FIG. 1A is shown in color to illustrate that a first area of each vessel slot may be illuminated with a first color, and a second area of each vessel slot may be illuminated with a second color.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein are systems, apparatuses, and methods for analyzing conditioned cue preference in an animal. Conditioned cue preference provides metrics for stimulant properties, liking, and reward and aversive learning. The system may include an apparatus for training an animal, and an apparatus for testing an animal. The testing and training apparatuses allow for high-throughput in order to allow efficient training and testing of a number of complex behavioral phenotypes.

Flies, as a non-limiting example animal to be analyzed, are able to discriminate blue light from green light. This ability may be exploited by pairing a particular drug of interest with a color cue. For example, the color green may be paired with access to a particular drug of abuse in a training apparatus. Then, the extent to which a fly's preference for that color changes as a result of the pairing can be measured in a testing apparatus. The system involving training and testing apparatuses may be implemented in two sequential stages: an initial conditioning or training method that permits the fly to learn to associate access to the drug with a conditioned cue, and a subsequent testing method in which the extent to which the perception of drug-associated reward has increased the fly's preference for the paired cue is tested. An emerging bias against the cue preference may reflect the perception of an aversive condition, while no change in conditioned preference may demonstrate that the fly is neutral to the drug's effects. It is understood that, although flies are described for ease of explanation, the present disclosure is not limited to use with flies.

In accordance with the present disclosure, animals such as flies may be trained in a group setting with, for example, ten flies introduced into a 50 mm petri dish. The bottom of the petri dish may contain a standard gel food medium, with one side containing the test substance, and the other side serving as a no-drug control. In the training apparatus, the drug/color pairing may be accomplished by aligning the halves of the petri dish with the drug to an area of a particular color projected from below or the side. Using microprocessor-controlled surface-mount RGB LEDs, as a non-limiting example of a suitable light source, the two halves of the circular bottom of the petri dish may be illuminated with blue (460 nm) and green (525 nm) light (FIG. 1A), respectively. Using a standard video tracking protocol, the locations of groups of 10 flies may be logged for a 72-hour training period. Whether flies initially demonstrate a significant bias towards or against the side containing the drug may be assessed. This metric reveals the fly's perception of the drug as having an agreeable or aversive taste (i.e., 'unconditioned liking'). The temporal dynamics with which location preferences change over the subsequent experimental period (for example, hours 3-72) reflect the emergence of a learned response to the drug's effects (i.e., 'conditioned liking'). A decrease in residence on food with the drug points to the development of a dislike for the drug, while the opposite indicates the emergence of liking. When compared with controls, changes in general measures of locomotion indicate a drug's psychostimulant (e.g., amphetamine, cocaine) or psychodepressant (e.g., alcohol, opioids) properties.

Referring now to FIG. 1A, a non-limiting example apparatus 10 for training an animal is depicted. The apparatus 10 may include a housing 12 which defines an area 14 that is at least partly enclosed. The area 14 may be formed from a platform 16, a ceiling 18, and side walls 20. The ceiling 18 may include one or more holes 22 configured to permit observation into the area 14 with a video camera or other device, and/or within which a video camera or other device may be mounted. The side walls 20 may substantially enclose the area 14, or may only partly enclose the area 14. In some embodiments, the apparatus 10 does not include any side walls 20 or a ceiling 18.

The platform 16 is generally a durable piece of material, such as a suitable plastic, and may be transparent or substantially transparent. However, the platform 16 does not need to be transparent. In some embodiments, such as the example depicted in FIG. 1A, the platform 16 has a rectangular cross-section. However, other cross-sectional shapes are entirely possible and encompassed within the scope of the present disclosure. The ceiling 18 may have a cross section which mirrors that of the platform 16, but does not need to. The ceiling 18 may be mounted on the side walls 20, which may be rigidly fixed to the platform 16. The platform 16 may have a first side 30, an opposing second side 32, a third side 34, and an opposing fourth side 36. The floor 24 similarly has a first side 30, an opposing second side 32, and a third side 34. However, as noted below, at the fourth side 36 of the platform 16, the floor 24 may extend further to create an area 26.

Referring still to FIG. 1A, the apparatus 10 may include a floor 24 on which the platform 16 is supported. The floor 24 may have a larger area than the platform 16, and may therefore extend for some area 26 beyond and adjacent to the partly enclosed area 14. Each of the platform 16, ceiling 18, side walls 20, and floor 24 may be laser-cut from acrylic sheets or 3D-printed out of a suitable material, such as a plastic material, and may or may not be composed of the same material. In some embodiments, some of the platform 16, ceiling 18, side walls 20, and floor 24 are composed of different materials, while in other embodiments, each of the platform 16, ceiling 18, side walls 20, and floor 24 are composed of the same material. The floor 24 provides structural support for the platform 16, and wiring or other components may be disposed between the floor 24 and the platform 16. The area 26 of the floor 24 also provides a space on which additional devices or apparatuses may be mounted, and may include holes 25 for mounting such devices or apparatuses. The floor 24 may be transparent or substantially transparent.

Referring still to FIG. 1A, the platform 16 has a thickness t through which a plurality of slots 28, 38, 70 are cut out. The slots 28, 38, 70 are configured to house or otherwise receive various components, as explained in more detail below. For example, the platform 16 may include slots 70 which are configured to receive the side walls 20 so as to fix the side walls 20 and ceiling 18 in place relative to the platform 16.

Figure 1B:
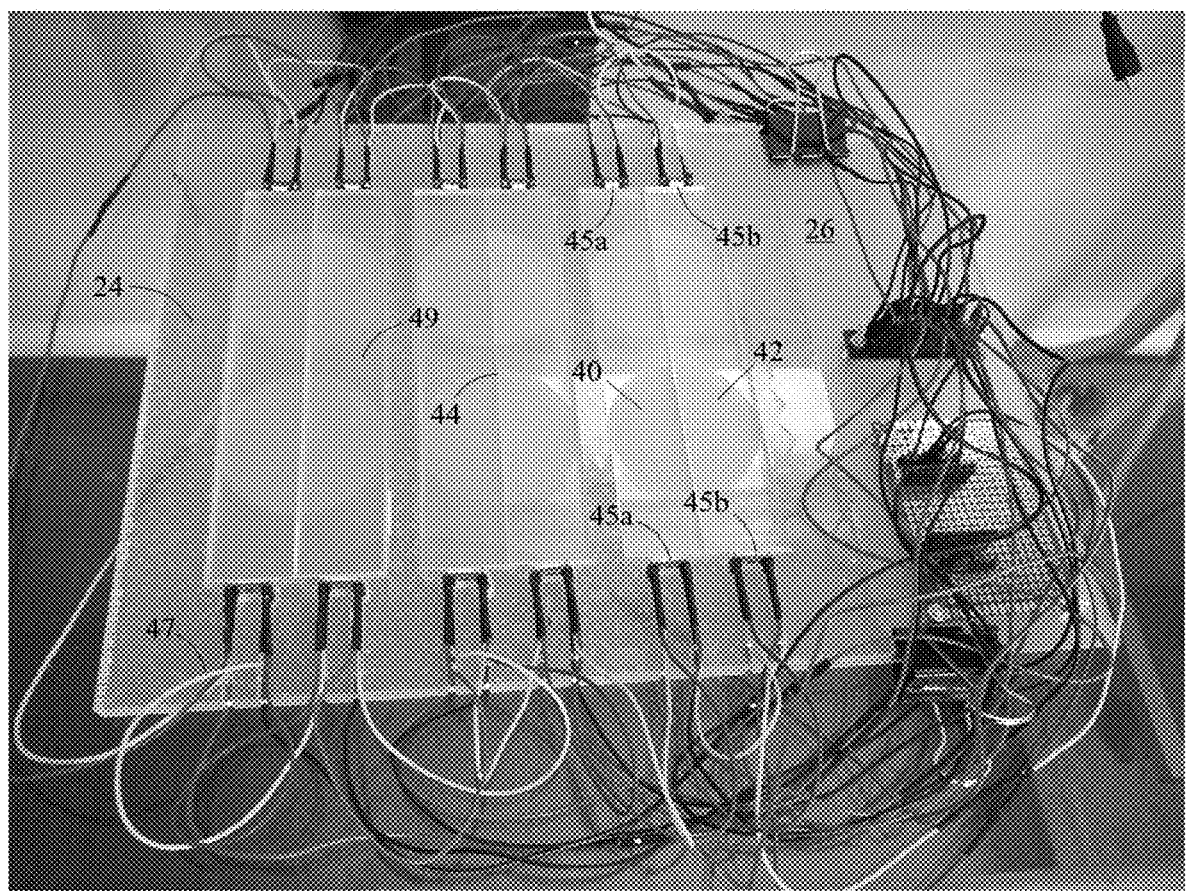

The platform 16 may include one or more vessel slots 38 that are configured to receive one or more vessels. The vessel slots 38 may be individually isolated from one another. The vessel slots 38 may each be sized to receive a vessel, such as the petri dish 41 depicted in FIG. 2 with one or more flies 43 in it. The vessel slots 38 may therefore have the shape of a petri dish 41, but this is not strictly necessary. Rather, the vessel slots 38 may take any suitable shape that allows for the desired vessels to be placed therein. A circular shape is shown in FIGS. 1A-1C for ease of illustration.

Figure 1C:
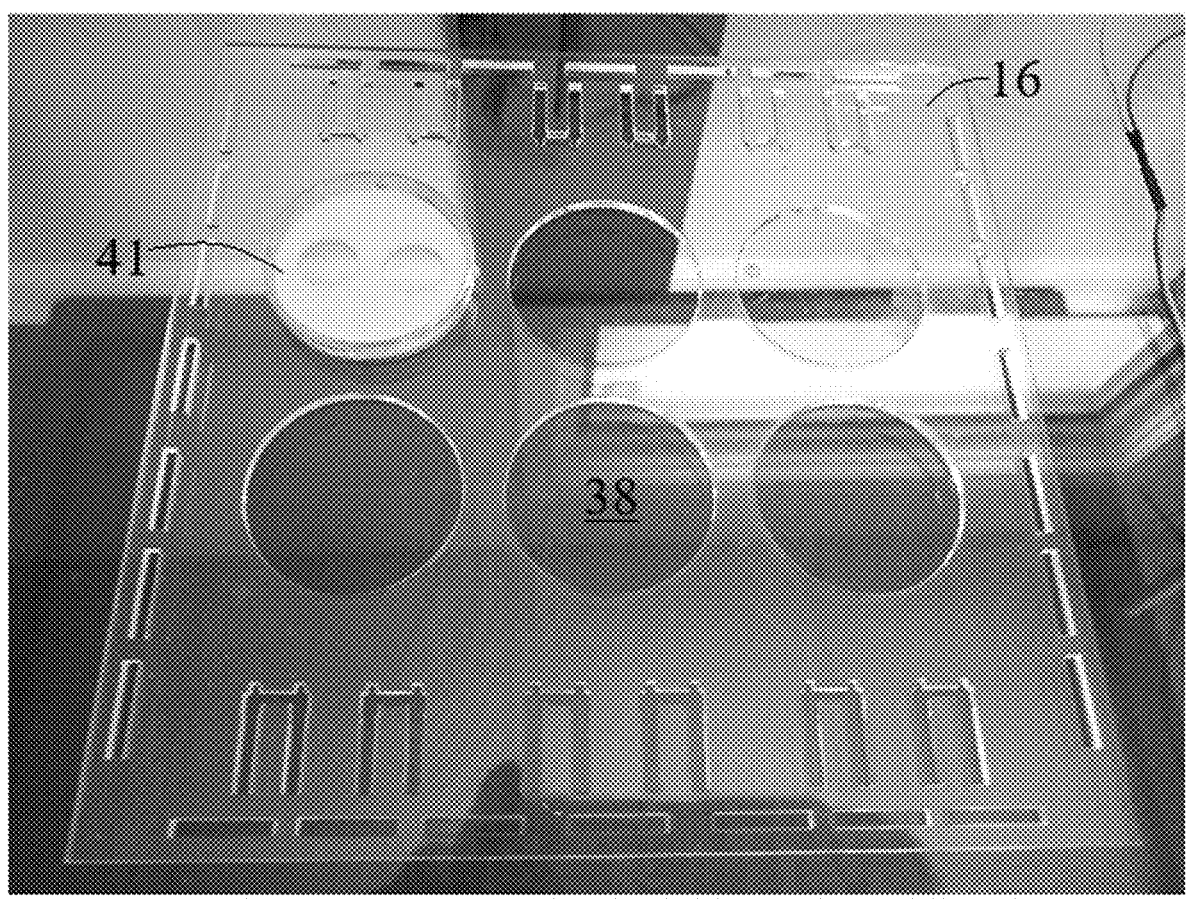

As seen in FIGS. 1A, 1C, each vessel slot 38 may be an area cut out of the platform 16 in the shape of a circle. The vessel slot 38 opens a view of the top surface of the floor 24 which may be laser-engraved with a grayscale pixel pattern. When illuminated from the side (i.e., from light sources 45a, 45b in the slots 46, 48, 60, 62), the engraved area illuminates the vessel slot 38 from below. A cut 44 (which may be made with a laser, or may be formed with separate acrylic inserts, or through other means) separates the vessel slot 38 into half circle areas 40, 42 with a straight dividing line which prevents light projected into the floor 24 under the vessel slot 38 from scattering from one side to the other. This generates two evenly illuminated areas (i.e., the half circle areas 40, 42). These evenly illuminated areas 40, 42 serve to produce two colored sides on the bottom of a vessel disposed within the vessel slot 38. The cut 44 may be aligned with an axis of the vessel that separates the food with the substance of interest (such as a drug) from the food without the substance of interest. In other words, the two colored areas 40, 42 may correspond exactly to the two sides of the vessel: the side having the drug, and the side not having the drug.

Figure 2:
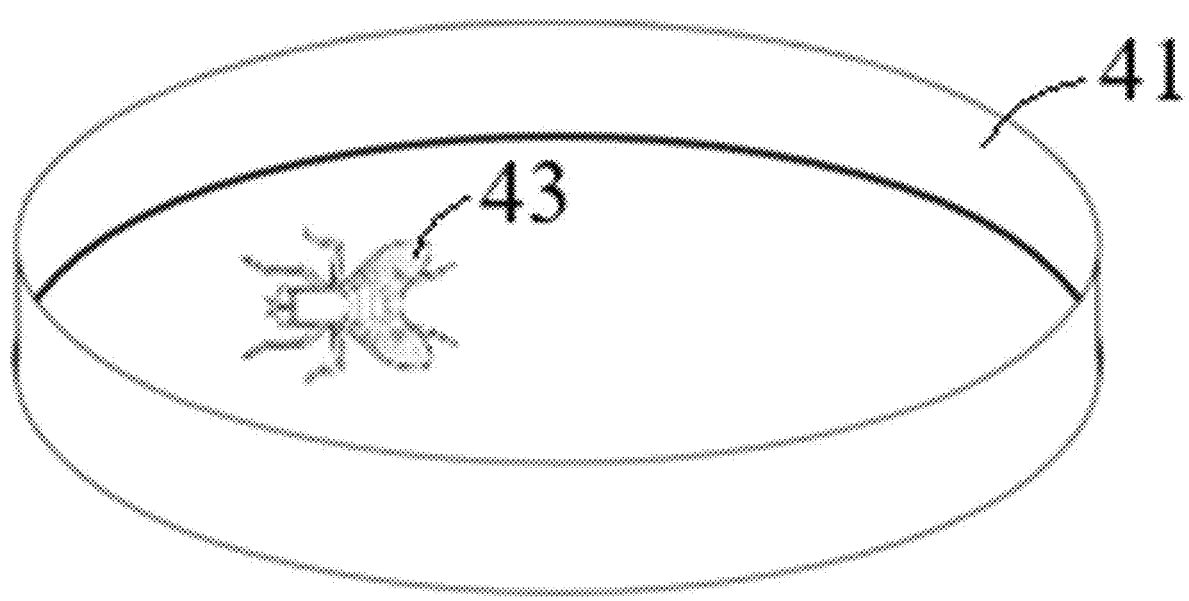
FIG. 2: Illustration of a petri dish vessel with a fly in it.

In use, the apparatus 10 may include one or more vessels within the area 14, and within the vessel slots 38. The vessels may be, for example, petri dishes 41 as depicted in FIG. 2, or other containers which may house food and one or more animals such as a fly 43. The vessels may be circular or substantially circular in shape, or may alternatively be rectangular in shape. Other shapes are possible. The shape of vessels is not particularly limited. The vessels may be disposed within the vessel slots 38, either in a secured manner, adhered to the floor 24 with an adhesive, or in a loose manner, without adhesive. Furthermore, the apparatus 10 may include vessels that are simply resting on the platform 16 and are not disposed within the vessel slots 38, provided that the projection of light from light sources may still illuminate each vessel in two colors, as described in more detail below.

Referring again to FIG. 1A, the apparatus 10 may include a plurality of vessel slots 38, which may be arranged in rows, such as a first row 64 and a second row 66. In other embodiments, the apparatus 10 includes only a single vessel slot 38. However, having a plurality of vessel slots 38 is advantageous in that it allows for high-throughput experiments. In one non-limiting example depicted in FIG. 1A-1C, the apparatus 10 includes a first row 64 of three vessel slots 38, 38c, 38e and a second row 66 of three vessel slots 38a, 38d, 38f, for a total of six vessel slots 38.

Figure 3:
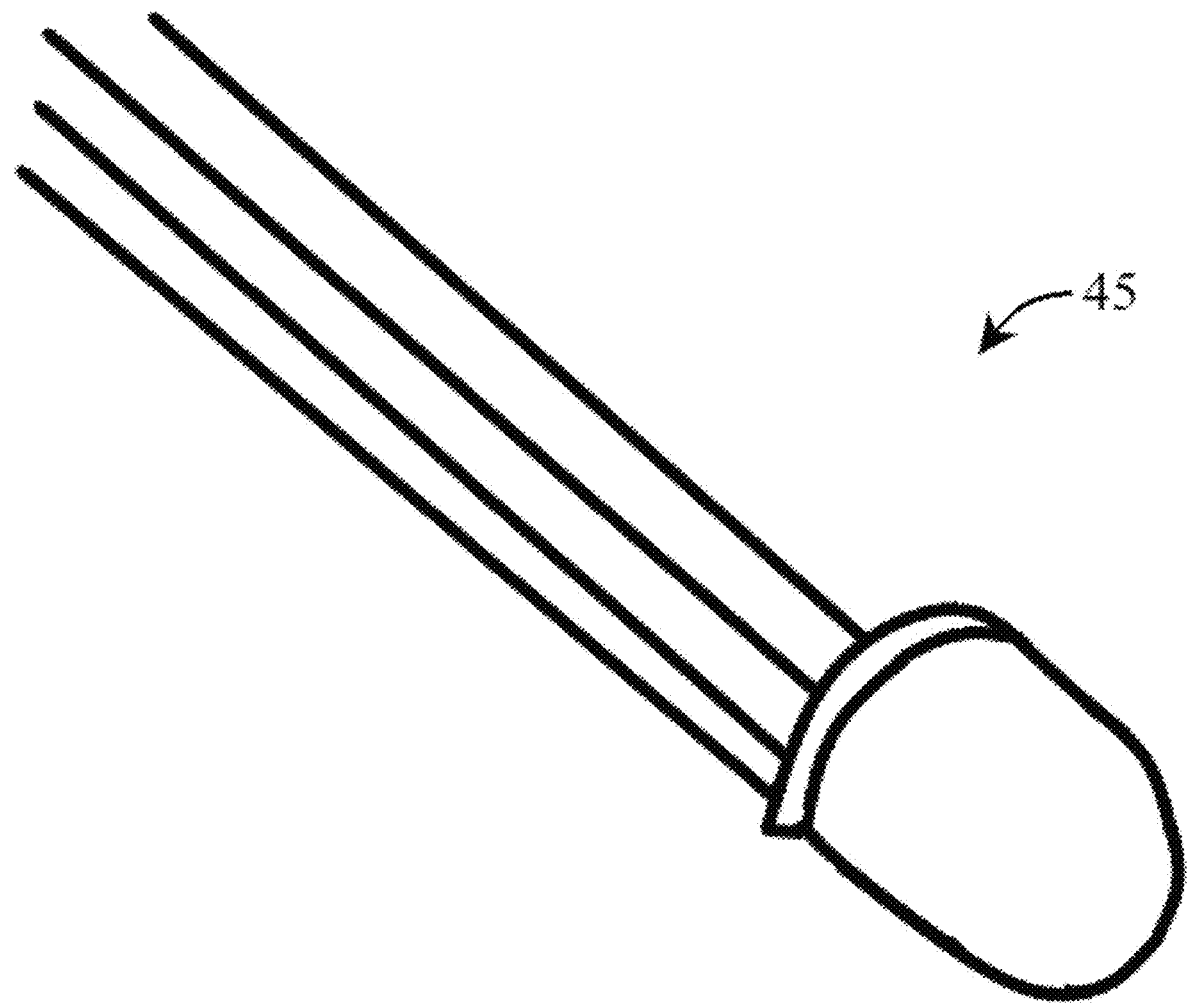
FIG. 3: Illustration of a non-limiting example light source.

Referring again to FIG. 1A, the floor 24 may include a number of light source slots 46, 48, 60, 62 configured to house light sources. Each light source slot 46, 48, 60, 62 may be aligned with slots in the platform 16 having a first elongated section 50 and a second elongated section 52 connected by a middle section 54, with a first head section 56 and a second head section 58. Each light source slot 46, 48, 60, 62 may have the identical shape and configuration as the slots in the platform 16 (i.e., may include a first elongated section, a second elongated section, a middle section, a first head section, and a second head section). A light source, such as an LED 45 depicted in FIG. 3, may be disposed within each light source slot 46, 48, 60, 62. The light source 45 may be positioned in the middle section of the respective light source slot 46, 48, 60, 62, corresponding to the middle section 54, with power and control wires that run through the first and second elongated sections 50, 52 in the platform 16. The light source 45 may shine light into the side of the floor 24, which illuminates the surface engraved area of the vessel slot 38 cut out of the platform 16. Each light source 45 may be a one-color LED, which actually has a red, a blue, and a green LED under separate control, allowing for the vessel slots 38 to be lit up in millions of different colors using the two sides separately. However, other configurations of light sources 45 are possible and encompassed within the scope of the present disclosure.

Referring to FIGS. 1A-1B, in general, each light source slot 46, 48, 60, 62 may be positioned to the side of a vessel slot 38, on either the first side 30 of the floor 24 or the opposing second side 32 of the floor 24, and may be configured to house a light source such as an LED 45 (FIG. 3) that can illuminate a colored light into the divided half circle areas 40, 42 of the vessel slot 38. In some embodiments, each half circle area 40, 42 is illuminated from each of the opposing two sides 30, 32. In such embodiments, each of the opposing two sides 30, 32 may have opposing light sources 45*a* or 45*b* aimed at the same half circle area 40, 42. In other words, the first side 30 may include the first light source slot 46 while the second side 32 includes an opposing first light source slot 60, both of which are aimed at the first area 40 of the same one or more vessel slots 38. Similarly, the first side 30 may include the second light source 48 while the second side 32 may include an opposing second light source 62, both of which are aimed at the second area 42 of the same one or more vessel slots 38. The use of opposing light sources 45*a* or 45*b* in light source slots 46, 48, 60, 62 on opposing sides 30, 32 provides for better, more uniform illumination of the vessel slots 38, but is not strictly necessary.

Each of the first side 30 and the second side 32 of the floor 24 may include numerous light source slots 46, 48, 60, 62, with the exact number depending on the desired size of the apparatus 10 and the desired number of vessels within the area 14. The light source slots 46, 48, 60, 62 may be arranged in an alternating pattern of first light source slots 46, 60 and second light source slots 48, 62, as seen in FIGS. 1A-1B. In the example depicted in FIGS. 1A-1C, the floor 24 includes six light source slots on each of the two opposing sides 30, 32: three sets of first light source slots 46, 60, and three sets of second light source slots 48, 62, where the second sets are numbered with 46*a*, 60*a* and 48*a*, 62*a*, and the third sets are numbered with 46*b*, 60*b* and 48*b*, 62*b*. Each first light source slot 46, 60 is configured to house a first light source 45*a* of a first color, and each second light source slot 48, 60 is configured to house a second light source 45*b* of a second color.

The light source slots 46, 48, 60, 62 are positioned such that, when the light sources 45*a*, 45*b* are present in them, the first light source 45*a* and the second light source 45*b* may illuminate the vessel slot 38 so as to segment the vessel slot 38 into a first area 40 illuminated by the first color and a second area 42 illuminated by the second color. In some embodiments, cut 44 prevents scattering of light between the two sides; the second half 42 is not illuminated with the first color, and the first half 40 is not illuminated with the second color.

The apparatus 10 may include a plurality of light sources, such as LEDs 45 (FIG. 3), disposed within the light source slots 46, 48, 60, 62. Referring now to FIG. 1B, a first light source 45*a* may be disposed in each of the first light source slots 46, 60. A second light source 45*b*, which may be composed of a light source of a particular color (which is a different color from that of the first light source), may be disposed in each of the second light source slots 48, 62. In some embodiments, the first color is green and the second color is blue. However, other colors are possible. Each of the light sources 45*a*, 45*b* may be powered by a suitable power source, or may be individually powered by batteries. When the light sources include wires 47, the wires 47 may be run through a space cut into platform 16 and/or the floor 24.

The first light source 45*a* and opposing first light source 45*a* may illuminate a first color across the area 14 from the first side 30 to the second side 32, or from the second side 32 to the first side 30, respectively, abutting the cut 44 which, in combination with the positioning of the light source 45*a*, may prevent the light from crossing into the second half circle area 42 of the vessel slot 38. Similarly, the second light source 45*b* and opposing second light source 45*b* may illuminate a second color across the area from the first side 30 to the second side 32, or from the second side 32 to the first side 30, respectively, abutting the cut 44 which, in combination with the positioning of the light source 45*b*, may prevent the light from crossing into the first half circle area 40 of the vessel slot 38. The light sources 45*a*, 45*b* may be positioned and aimed such that the first color light and the second color light meet each other along the straight dividing line formed from the cut 44, which divides the vessel slot 38. With the aid of scattering from the cut 44, the first light source 45*a* may be able to illuminate the first half circle area 40 with the first color without illuminating the second half circle area 42 with the first color. Similarly, the second light source 45*b* may be able to illuminate the second half circle area 42 with the second color without illuminating the first half circle area 40 with the second color. Thus, the vessel slot 38 may be effectively divided by distinct colors in the two areas 40, 42, which may correspond to the areas in a vessel disposed within the vessel slot 38 having food with and without a drug.

In embodiments where the area 14 includes multiple rows 64, 66 of vessel slots 38 and vessels, each of the opposing light sources 45*a* or 45*b* in the opposing light source slots 46, 60 and 48, 62 may be used to illuminate a half circle area 40, 42 of more than one vessel slot 38, 38*a* and vessel. For example, as seen in FIG. 1A, each light source 45*a* or 45*b* and opposing light source 45*a* or 45*b* may illuminate a half circle area 40, 42 of two vessel slots 38, one in each of two rows 64, 66 of vessel slots 38. However, this is not strictly necessary. In the embodiment depicted in FIGS. 1A-1C, the vessel slots 38 are arranged in each of a first row 64 and a second row 66. In some embodiments, the light from the first light source 45*a* in the first light source slot 46 and the opposing first light source 45*a* in the opposing first light source slot 60 may illuminate the first half circle areas 40, 40*a* of vessel slots 38, 38*a* in each of the rows 64, 66 while not illuminating the second half circle areas 42, 42*a* of the vessel slots 38, 38*a*. A similar effect may occur with respect to a second set of vessel slots 38*c*, 38*d*, and a third set of vessel slots 38*e*, 38*f*. Each vessel slot 38 may thus be evenly illuminated from the side, part in a first color and part in a second color, with the cut 44 forming a straight dividing line between the two areas 40, 42. However, it is not necessary that the vessel slots 38 be divided precisely in half to form areas 40, 42 of the same size or shape; rather, it is simply important that each vessel slot 38 include two distinctly illuminated areas 40, 42.

Each of the light source slots 46, 48, 60, 62 may have corresponding slots formed in the platform 16, as shown for instance with the aligned slots 68 in FIG. 1A. In this manner, light sources may be disposed within the floor 24 with suitable space cut out of the platform 16 for wiring, and may be used to illuminate the vessel slots 38 through the material of the floor 24, provided that the floor 24 is at least somewhat transparent. However, this is not strictly necessary. Moreover, it is not necessary that the floor 24 be transparent, as the light source slots 46, 48, 60, 62 may extend through the floor 24 to the vessel slots 38, meaning the light sources do not need to illuminate light through the floor material in order to project light into the vessel slots 38.

Referring still to FIG. 1A, other slots 70 in the platform may be configured to receive the side walls 20, which may extend from the platform 16 to corresponding slots 72 the ceiling 18. Furthermore, additional slots 28 may be utilized for connecting the platform 16 to the floor 24.

FIG. 1B shows a photograph of a non-limiting example floor 24 for the training apparatus 10 depicted in FIG. 1A. The floor 24 shown in FIG. 1B includes light sources 45a, 45b embedded within light source slots in the floor 24, and further shows surface scored acrylic inserts 49 which include or form the cut 44 seen FIG. 1A. The scored acrylic inserts 49 may be positioned underneath the vessel slots 38 in the platform 16. The result is the vessel slots 38 being scored half circle areas that get illuminated from the side and scatter the light upwards into the platform 16. FIG. 1C shows a photograph of a non-limiting example platform 16 for the training apparatus 10 depicted in FIG. 1A, and for use in conjunction with the floor 24 shown in FIG. 1B. The platform 16 can hold petri dishes 41 in the vessel slots 38 which, when in position on the floor 24 with light sources 45a, 45b, are illuminated from below. As seen in FIG. 1C, the vessel slots 38 are configured to hold a petri dish 41, and therefore may have a bottom. Alternatively, a vessel slot 38 may have tapered sides configured to hold the petri dish 41 in place. As another alternative, the petri dish 41 positioned within the vessel slot 38 may rest directly upon the scored acrylic inserts 49 of the floor 24 positioned beneath the platform 16, such that the scored acrylic inserts 49 form the bottom of the vessel slots 48.

In use, the training apparatus (FIGS. 1A-1C) permits flies to associate the presence of a test drug with a particular color. In some examples, the setup can incorporate six petri dishes housing groups of ten flies each. Standard gel food may be placed into the bottom of each vessel, where food in half of the vessel contains the test drug and the alternate side serves as a no-drug control. The drug-containing area is aligned with a particular color projected into the vessel from the side or below. The drug pairing may be stratified for color with equal numbers of flies (i.e., 3 groups of 10 flies each) trained to an association with either green or blue. Alternatively, two different drugs, or the same drug in different doses, can be placed into the two sides, and subsequent testing may determine which side is more rewarding to the fly based on a change in paired cue preference.

The projection of a colored, side-mounted LED lighting system into the platform below the petri dishes is important. A laser-engraved area in the shape of a half circle may scatter that light into an evenly illuminated area below the petri dish. A cut between the two halves may allow for illuminating the sides with two different colors, with a clear separation between the two sides. The dividing line between the two colored sides may be aligned with the axis of the petri dish separating food with drug from the food without it.

Figure 4:
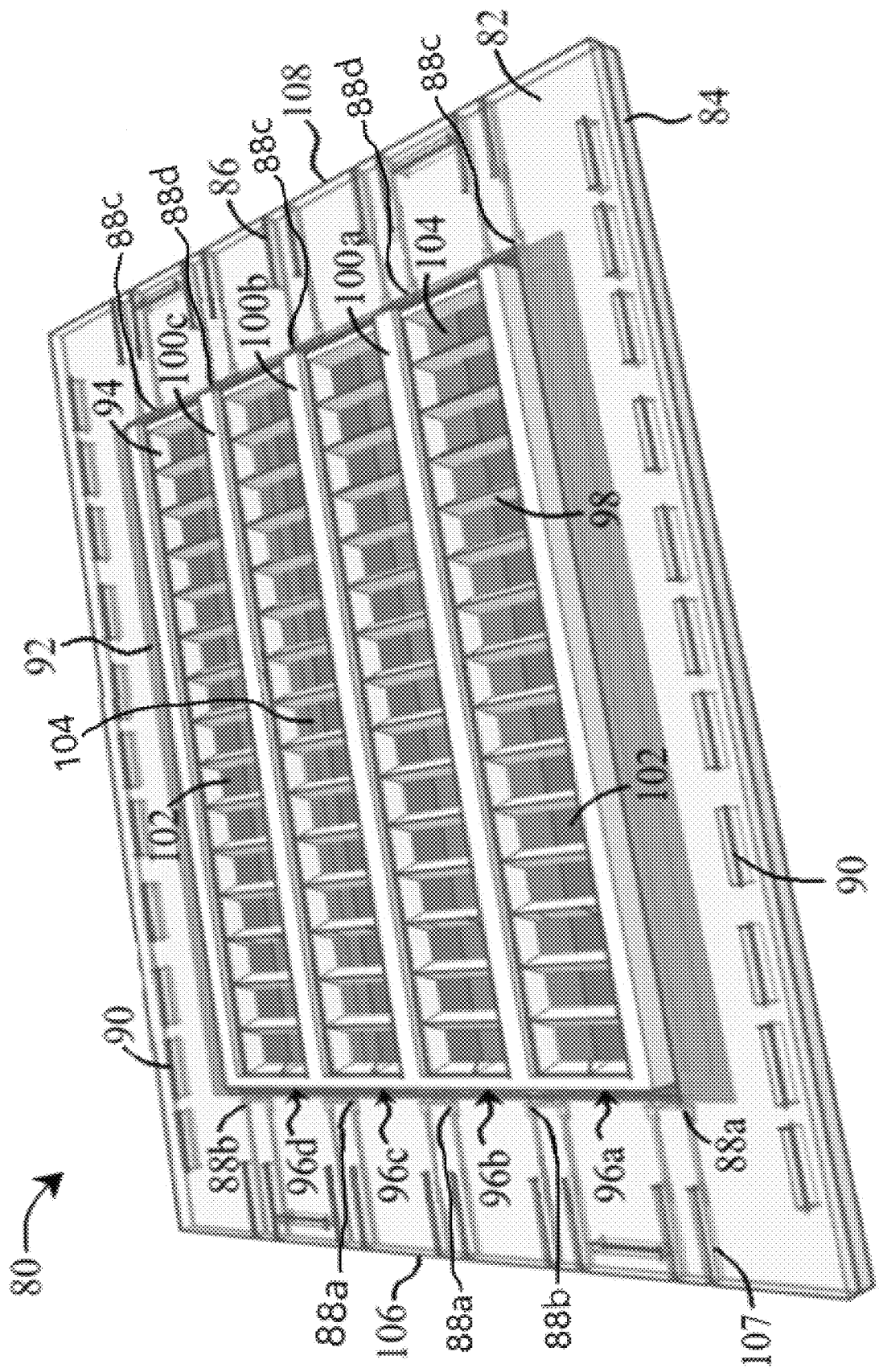
FIG. 4: Illustration of a non-limiting example embodiment of a testing apparatus. The illustration is shown in color to illustrate that a first area of each cell may be illuminated with a first color, and a second area of each cell may be illuminated with a second color.

Trained flies that have learned a particular drug and color cue pairing may be subsequently tested individually for the presence and strength of a conditioned color bias. To accomplish this, flies may be transferred under $CO_2$ anesthesia from the training apparatus into a testing apparatus, which may include, for example, a 15×4 grid of individual testing cells subdivided into two halves and illuminated by the two colors used in training (FIG. 4). For a period of time, such as a 1-hour period, each fly's position (association) relative to the colors may be tracked, in order to assess their conditioned color preference. Analysis of spatial locations may be used to identify the extent to which the drug pairing has altered the fly's preferences for the paired color.

Referring now to FIG. 4, a non-limiting example apparatus 80 for testing a preference is depicted. Similar to the training apparatus 10 depicted in FIG. 1A, the testing apparatus 80 may include a platform 82 supported on a floor 84. In fact, the testing apparatus 80 may include a partly enclosed area further defined by side walls and a ceiling similar to the training apparatus 10 depicted in FIGS. 1A-1C. However, for ease of illustration, the ceiling and side walls of the testing apparatus 80 are omitted from FIG. 4. The platform 82 is supported on the floor 84. Platform 82 includes a plurality of slots 90 for connecting the platform 82 to the floor 84 and/or side walls. The platform 82 further includes a well 92 cut out of it, which is a large section in the center of the platform 82 configured to receive numerous cells 94 in which an animal's preference for color may be individually assessed. Floor 84 includes a plurality of slots 86 engraved therein for housing light sources 88. The top surface of floor 84 may be engraved with a grayscale pixel pattern to illuminate the well 92 from below.

The cells 94 within the well 92 may be arranged in a plurality of rows 96a, 96b, 96c, 96d such as the first row 96a, second row 96b, third row 96c, and fourth row 96d depicted in FIG. 4. Each row 96a, 96b, 96c, 96d may include many cells 94. In the non-limiting example depicted in FIG. 4, each row 96a, 96b, 96c, 96d includes fifteen cells 94. However, other arrangements of the cells 94 are entirely possible and encompassed within the scope of the present disclosure. In the example embodiment depicted in FIG. 4, the testing apparatus 80 includes a first row 96a of cells 94, a second row 96b of cells 94, a third row 96c of cells 94, and a fourth row 96d of cells 94. Each cell 94 may be separated from other cells 94 by walls 98 which extend to a height at least high enough to prevent the animal being tested from leaving the cell 94. Divider walls 100a, 100b, 100c, which may be perpendicular to the walls 98, separate the rows 96a, 96b, 96c, 96d from each other. The bottom of each cell 94 is formed from the floor 84, and is configured to be illuminated as described below. The tops of the cells 94 may be covered with any suitable transparent covering to prevent animals such as flies from flying out of the cells 94. Non-limiting example coverings include glass or plastic sheets. Also, the cells 94 may be removed from the well 92, and the configuration or number of cells 94 may be changed by replacing the cells 94 with a different configuration of cells 94 within the well 92, without the need to replace the configuration of light sources 88a, 88b, 88c, 88d.

Within each cell 94 in the well 92, a first area 102 of the floor 84 may be projected with a first color, and a second area 104 of the floor 84 may be projected with a second color. Light source slots 107 are positioned in the floor 84 such that light sources 88 within the light source slots 107 may project the first color into the first area 102 and the second color into the second area 104 of at least one, but preferably each, cell 94. To accomplish this, the light source slots 107 may be positioned on opposing sides 106, 108 of the floor 84, and therefore opposing sides of the well 92. The platform 82 may include slots 86 which may align with the light source slots 107 in the floor 84, thereby providing a space for light sources 88 and any necessary wiring in the platform 82 and/or the floor 84. Light sources 88 may be disposed in the light source slots 107 in the floor 84, and wiring for the light sources 88 may extend through the light source slots 86 in the platform 82. However, other configurations are possible and encompassed within the scope of the present disclosure.

Referring still to FIG. 4, a first light source 88a may be used to project the first color in the first area 102 of each cell 94 in the first row 96a of cells 94. A second light source 88b may be used to project the second color in the second area 104 of each cell 94 in the first row 96a of cells 94 while simultaneously projecting the second color into the second area 104 of each cell 94 in the second row 96b of cells 94. An additional first light source 88a may be used to project the first color in the first area 102 of each cell 94 in the second row 96b while simultaneously projecting the first color into the first area 102 of each cell 94 in the third row 96c. An additional second light source 88b may be used to project the second color into the second area 104 of each cell 94 in the third row 96c while simultaneously projecting the second color into the second area 104 of each cell 94 in the fourth row 96d. A first light source 88a may be used to project the first color into the first area 102 of each cell 94 in the fourth row 96d. In this configuration, the first row 96a and the second row 96b have the second area 104 of each cell 94 separated by the divider wall 100a, while the second row 96b and the third row 96c have the first area 102 of each cell 94 separated by the divider wall 100b, and the third row 96c and the fourth row 96d have the second area 104 of each cell 94 separated by the divider wall 100c. In this manner, efficiency may be improved by requiring fewer light sources.

Additionally, an opposing set of light sources 88c, 88d may be disposed on the side 108, where each light source 88c is a first light source and each light source 88d is a second light source. The opposing light sources 88a, 88c may together illuminate the first area 102 of the cells 94 in any row 96a, 96b, 96c, 96d with the first color, and the second light sources 88b, 88d may together illuminate the second area 104 of the cells 94 in any row 96a, 96b, 96c, 96d with the second color.

Referring still to FIG. 4, the first area 102 and the second area 104 may be equal halves of the cell 94, but do not need to be equal halves. In other words, each cell 94 includes a first area 102 which may be projected with the first color and a second area 104 which may be projected with the second color. Walls 98, 100 separate the cells 94, the number of which may be tailored for the desired application. Moreover, though FIG. 4 depicts rectangular cells 94, the cells 94 need not be rectangular, provided that each cell 94 includes a first area 102 that the light sources 88 may project with the first color and a second area 104 that the light sources 88 may project with the second color.

The light sources 88 which project the first and second colors into each cell 94 may be disposed within the light source slots 107 similar to the training apparatus 10 depicted in FIGS. 1A-1C. The testing apparatus 80 may include a plurality of light source slots 107 in the floor 84 configured to house light sources 88a, 88b, 88c, 88d that are positioned so as to illuminate the floor 84 within the well 92 as described.

Referring still to the example embodiment of the testing apparatus 80 depicted in FIG. 4, each of two opposing sides 106, 108 of the testing apparatus 80 may include an alternating arrangement of first light sources 88a, 88c and second light sources 88b, 88d in the light source slots 107. A single light source 88 may be used to simultaneously illuminate sections of cells 94 in two different rows 96a, 96b, 96c, 96d of cells 94, as seen in FIG. 4.

Additional slots 90 in the platform 82 may be used for connecting the platform 82 to the floor 94, or for connecting the platform 82 to side walls that rise to a ceiling to form an enclosure. Each of the platform 82 and floor 84 may be 3D printed from a suitable material such as a plastic material. In some embodiments, the platform 82 is transparent. In some embodiments, both of the platform 82 and the floor 84 are transparent. However, it is not necessary that the platform 82 or the floor 84 be transparent, as the light source slots 86 may extend through the platform 82 to the well 92, meaning the light sources 88 do not need to illuminate light through the platform material in order to project light onto the floor 84 in the cells 94.

In use, an example of the testing apparatus moves each trained fly into a cell of a 15×4 grid arena where this preference for color is individually assessed. Half of the fly's cell features a floor with projected green color, and the other half has a floor with blue lighting. Standard tracking software may be used to obtain residence probabilities for each fly as it places itself in one of the two colored sides. A consistent bias in choosing the drug-paired color affirms the existence of drug-associated reward, and the extent of the bias reflects the strength with which reward circuitry was activated during training. In this manner, the training apparatus and the testing apparatus may be used together in a system for evaluating conditioned cue preference.

Suitable lighting may be used with either or both of the training apparatus and the testing apparatus to ensure accurate observation of the animals. Similarly, any suitable video camera may be utilized with either or both of the training apparatus and the testing apparatus in order to monitor training and testing of the animals. The training apparatus and the testing apparatus may be packaged together as part of a kit or kits, but need not be. In fact, each of the training apparatus and the testing apparatus is independently useful without the other. For example, the training apparatus may be used to train animals to prefer one color over another, such as by providing food for the animal in the area of one color and not the other, without regard for an association between the preferred color and any particular substance. Similarly, the testing apparatus may be used to test an animal's preference for a color without having any pre-trained association between a test substance and a particular color.

When applied to a drug such as amphetamine, the systems, apparatuses, and methods described herein may reveal a number of key quantities related to addiction-like phenomena in animals such as fruit flies. For example, it is possible to identify the magnitude and time course of psychostimulant effects, a like/dislike for the taste associated with the drug, a like/dislike for its resulting behavioral effects, and the activation of natural reward pathways.

Examples

Fly Handling

In an example use, the system including the training apparatus and the testing apparatus may be used with Berlin K (BK) wild type male and female flies. All flies may be raised on a cornmeal-sucrose-agar food in a 25° C. incubator with a 12-hr Light/Dark cycle and can be 3-5 days old at the start of each experiment. Flies may be subjected to $CO_2$ anesthesia and placed into the training apparatus for the conditioning setup. Under anesthesia the flies may then be transferred to the testing apparatus.

Components and Manufacturing

In an example production of the training apparatus and testing apparatus, the components to assemble the respective apparatuses may be manufactured from laser-cut sheets of acrylic. A 60-grid testing arena for the testing apparatus may be 3D printed in PLA. Lighting may be provided by an array of RGB LEDs (Adafruit ProductID: 2343; DotStar Addressable 5050 RGB LED w/Integrated Driver), surface mounted on a breakout board (Adafruit ProductID: 1762; 5050 LED breakout PCB), and driven via an SPI interface.

Certain embodiments of the systems, apparatuses, and methods disclosed herein are defined in the above examples.

It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. An apparatus comprising:
   a platform disposed on a floor, wherein the platform defines a plurality of slots therein;
   a vessel slot in the platform configured to house a vessel defining a vessel area, and a cut in the vessel slot dividing the vessel slot into a first area and a second area;
   a first light source slot in the floor configured to house a first light source of a first color; and
   a second light source slot in the floor configured to house a second light source of a second color;
   wherein the first light source slot and the second light source slot are positioned in the floor such that the first light source may illuminate the first area with the first color, and the second light source may illuminate the second area with the second color.

2. The apparatus of claim 1, wherein the cut is a straight dividing line between the first area and the second area.

3. The apparatus of claim 1, wherein the first area and the second area are half circles.

4. The apparatus of claim 3, wherein the half circles are equally sized.

5. The apparatus of claim 1, wherein the cut is configured to restrict light projected into the vessel slot into the first area or the second area.

6. The apparatus of claim 1, wherein the platform is within an at least partly enclosed area having side walls and a ceiling.

7. The apparatus of claim 1, further comprising:
   a vessel positioned within the vessel slot;
   a first light source in the first light source slot; and
   a second light source in the second light source slot.

8. The apparatus of claim 7, wherein:
   the first light source is configured to illuminate the first area, and not the second area, with the first color; and
   the second light source is configured to illuminate the second area, and not the first area, with the second color.

9. The apparatus of claim 1, wherein the floor has a larger area than the platform.

10. The apparatus of claim 1, comprising a plurality of the vessel slots.

11. The apparatus of claim 10, comprising a plurality of vessels in the vessel slots.

12. The apparatus of claim 10, wherein the apparatus comprises a first row of vessels and a second row of vessels, and the first light source is configured to illuminate the first area of each of the vessels in the first row and the second row with the first color, and the second light source is configured to illuminate the second area of each of the vessels in the first row and the second row with the second color.

13. The apparatus of claim 1, comprising a plurality of first light sources and a plurality of second light sources, wherein each of the first light sources is configured to illuminate the first area, and not the second area, of at least one vessel with the first color, and each of the second light sources is configured to illuminate the second area, and not the first area, of at least one vessel with the second color.

14. The apparatus of claim 13, wherein each of the first light sources is configured to illuminate the first area of a plurality of vessels, and each of the second light sources is configured to illuminate the second area of a plurality of vessels.

15. The apparatus of claim 1, wherein the first area and the second area are separated by a straight line where the first color and the second color meet.

16. The apparatus of claim 1, wherein the floor comprises engraved slots configured to house the first light source and the second light source.

17. The apparatus of claim 1, wherein the vessel is configured to hold a food and to house an animal.

18. The apparatus of claim 11, wherein each side of the vessels holds gel food medium, wherein a first side contains a test substance and a second side does not contain the test substance.

19. The apparatus of claim 11, wherein each side of the vessels holds gel food medium, wherein a first side contains a first test substance and a second side contains a second test substance.

20. The apparatus of claim 1, further comprising a video camera configured to observe within the area.

21. The apparatus of claim 1, wherein the vessel is a petri dish.

22. An apparatus comprising:
   a platform supported on a floor, the platform defining a well;
   a plurality of cells in the well, wherein each cell is defined by the floor and walls, and each cell is separated from one another;
   a first light source slot in the floor being configured to house a first light source of a first color; and
   a second light source slot in the floor being configured to house a second light source of a second color;
   wherein the first light source slot and the second light source slot are positioned in the floor with respect to the plurality of cells such that a first light source of a first color disposed in the first light source slot may illuminate a first area of the floor inside at least one of the cells with the first color, and a second light source of a second color disposed in the second light source slot may illuminate a second area of the floor inside the at least one cell with the second color.

23. The apparatus of claim 22, wherein the plurality of cells comprises a plurality of rows of the cells.

24. The apparatus of claim 22, wherein each of the rows is separated from an adjacent row by a divider wall.

25. The apparatus of claim 23, wherein the second light source slot is positioned so as to allow a second light source disposed in the second light source slot to illuminate the first area of the floor inside the at least one cell and to illuminate the first area of the floor inside at least one cell in a different row of the plurality of rows.

26. The apparatus of claim 22, comprising a plurality of first light source slots and a plurality of second light source slots.

27. A system comprising:
   a first apparatus configured to establish an association to an animal between a test substance and a color; and a second apparatus configured to test the animal's preference for, or aversion to, a colored cue that was paired to the test substance by presenting the animal a choice between two spaces, wherein one of the spaces is illuminated with the color and the other one of the spaces is illuminated with a different color.

28. The system of claim 27, further comprising a video camera configured to observe animals in the first apparatus or the second apparatus.

29. The system of claim 27, further comprising tracking software configured to track movement of the animals in either of the first apparatus or the second apparatus.

30. A method for analyzing conditioned cue preference, the method comprising:
exposing an animal to a test substance in a vessel containing food divided between two areas, wherein a first area includes food with the test substance and is illuminated with a first color, and a second area includes food without the test substance and is illuminated with a second color; and
removing the animal from the exposure to the test substance, and providing the animal with a choice between the first color and the second color to analyze the animal's conditioned cue preference.

31. The method of claim 30, wherein the illumination of the first area and the second area is by light sources mounted within slots of an apparatus housing the vessel.

32. The method of claim 31, wherein the slots are in the apparatus on a first side of the vessel and an opposing second side of the vessel.

* * * * *